March 21, 1967 M. H. MATER 3,310,079

LUMBER PROCESSING SYSTEM

Filed June 23, 1965 6 Sheets-Sheet 1

Inventor
Milton H. Mater
By Dressler, Goldsmith, Clement, Gordon & Ladd
Attorneys

United States Patent Office 3,310,079
Patented Mar. 21, 1967

3,310,079
LUMBER PROCESSING SYSTEM
Milton H. Mater, Corvallis, Oreg., assignor to Appleton Machine Company, a corporation of Wisconsin
Filed June 23, 1965, Ser. No. 466,244
7 Claims. (Cl. 143—37)

This invention relates to a lumber processing system, and more particularly, to a method and apparatus for automatically separating the wane edges from good cut board. As used herein, the term "cut board" denotes slabs of lumber which have been passed through edger saws for removal of the wane edges.

A great need has developed in the lumber industry for a system that is capable of separating the wane edges from good cut board in an automatic operation, without compressing the side of the cut board against an upstanding member. This compression is known as "pinching," and it results from the timber bind (internal fiber stresses of the lumber) which causes the lumber to be urged toward the adjacent upstanding member. Any pinching can slow down the feed of the lumber through the saws or cause it to stop completely.

Although wane edge separators, commonly known as "edging tailers," are widely used in the lumber industry, the prior art edging tailers have many deficiencies. Generally they include a vertical member disposed along the outfeed conveyor and aligned in the plane of the edger saw. The function of the vertical member is to enter the kerf and to urge the wane edges away from the cut board.

The use of a vertical member to separate the wane edges often results in pinching because the timber bind causes the cut board to be urged toward the vertical separating member. The resulting friction between the board and the separating member prevents the board from being properly conveyed for further processing. Any slowdown in the outfeed of the board due to even a slight pinching of the board against the separating member may result in severe pinching of the board against the edger saw blade. This may cause severe damage to the saw and stoppage of the edging apparatus.

Stoppage of the edging apparatus may also be caused if the vertical separating member is not directly in the plane of the edger saw. In this event, the vertical member will not enter the kerf, and instead may abut the end of the board. The possibility of damage resulting from the separating member abutting the end of the board is apparent.

It can be seen that it is highly desirable to provide an edging tailer that separates the wane edges from the cut board without causing pinching to occur. The disadvantageous use of a vertical separating member is obviated by the present invention.

In accordance with the present invention, a slab of lumber which requires trimming is conveyed to a plurality of edger saws. The edger saws are laterally shifted to a desired cutting position and outfeed conveyor belts, each having a width that is smaller than the distance between two saws, are also laterally shifted, whereby each belt is positioned intermediate the planes of two of the edging saws. The lumber slab is trimmed by the saws and the cut board is conveyed away therefrom on the outfeed conveyor belts while the wane edges are allowed to fall to a lower plane due to lack of support.

Although ordinarily it is preferable that each of the belts have a width that is smaller than the distance between two saws so that the wane edges will be unsupported and will fall to a lower plane, in some constructions each of the belts may be wider than the distance between two saws. While in such constructions the wane edges would remain on these belts if the belts were static, the vibration of the belts during movement thereof will cause the wane edges to fall therefrom and thus such belts operate in an equivalent manner to the belts having a smaller width.

To achieve a highly efficient and automatic operation, the outfeed belts are automatically positioned between the planes of the edger saws in response to lateral movement of the saws. The present invention includes an outfeed conveying apparatus which is positioned adjacent to the edger saws in board-receiving relationship therewith. The apparatus includes outfeed belts, each having a width that is smaller than the distance between two saws.

The outfeed belt supporting system includes a track upon which the belts can slide laterally, and there is provided a mechanism for automatically laterally shifting the belts to position each of them intermediate the cutting planes of two of the edger saws.

The mechanism for laterally shifting the belts is automatically controlled in response to relative lateral shifting of the edger saw. To this end, there is provided a control system which will effect actuation of the mechanism for lateral shifting of the outfeed belts, when the control system is actuated in response to lateral shifting of the saw. When the outfeed belts have been laterally shifted to the desired position, the control system will automatically stop further lateral movement of the belts.

A more detailed explanation of the invention is provided in the following description and is illustrated in the accompanying drawings, in which.

Figure 1:
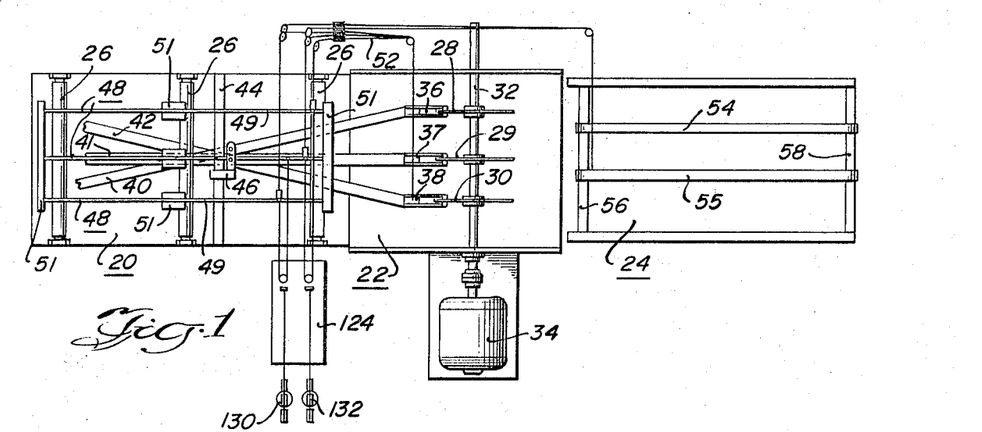
FIGURE 1 is a plan view of a lumber processing system in accordance with the teachings of the present invention.
Figure 2:
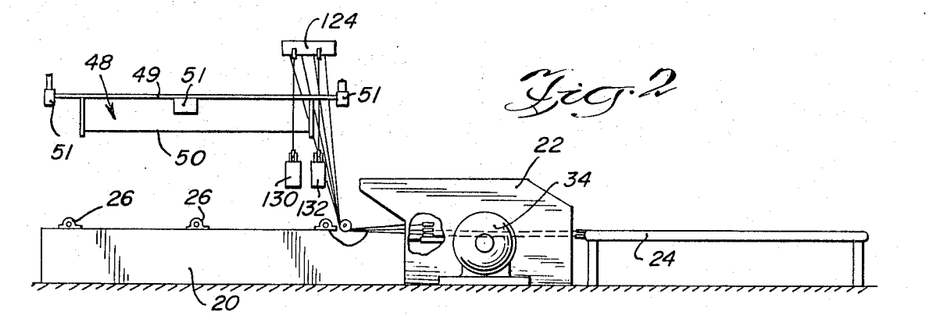
FIGURE 2 is a side elevational view thereof.
Figure 3:
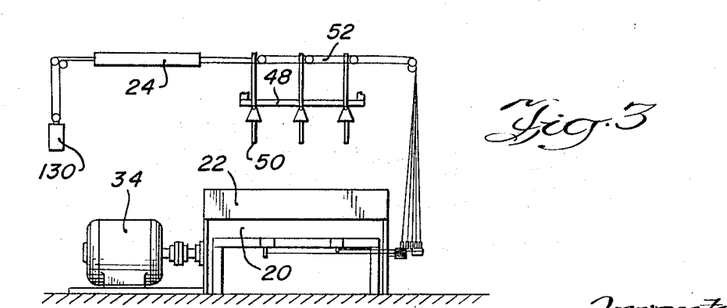
FIGURE 3 is a rear elevational view thereof.
Figures 4, 5:
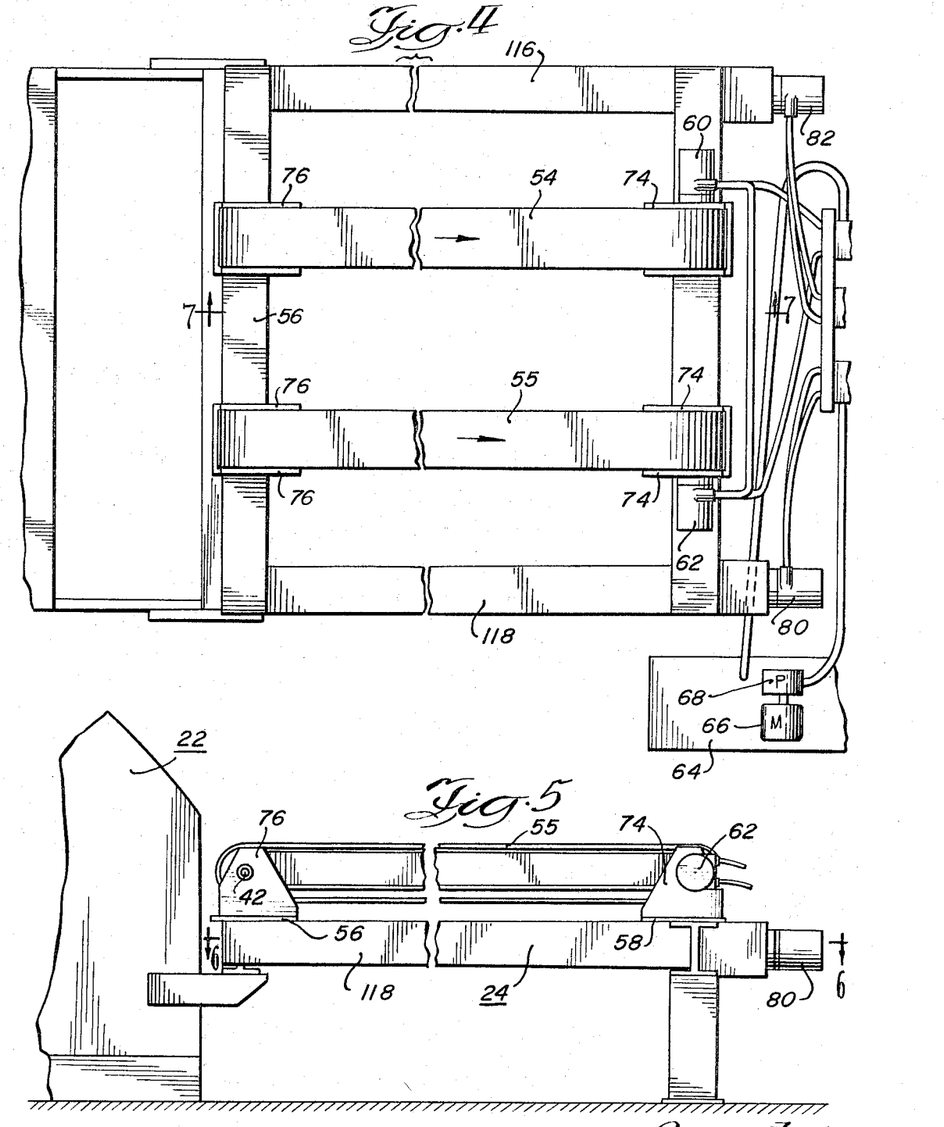
FIG. 4 is a fragmentary enlarged plan view of the outfeed belts.
FIGURE 5 is a side elevational view thereof.
Figure 6:
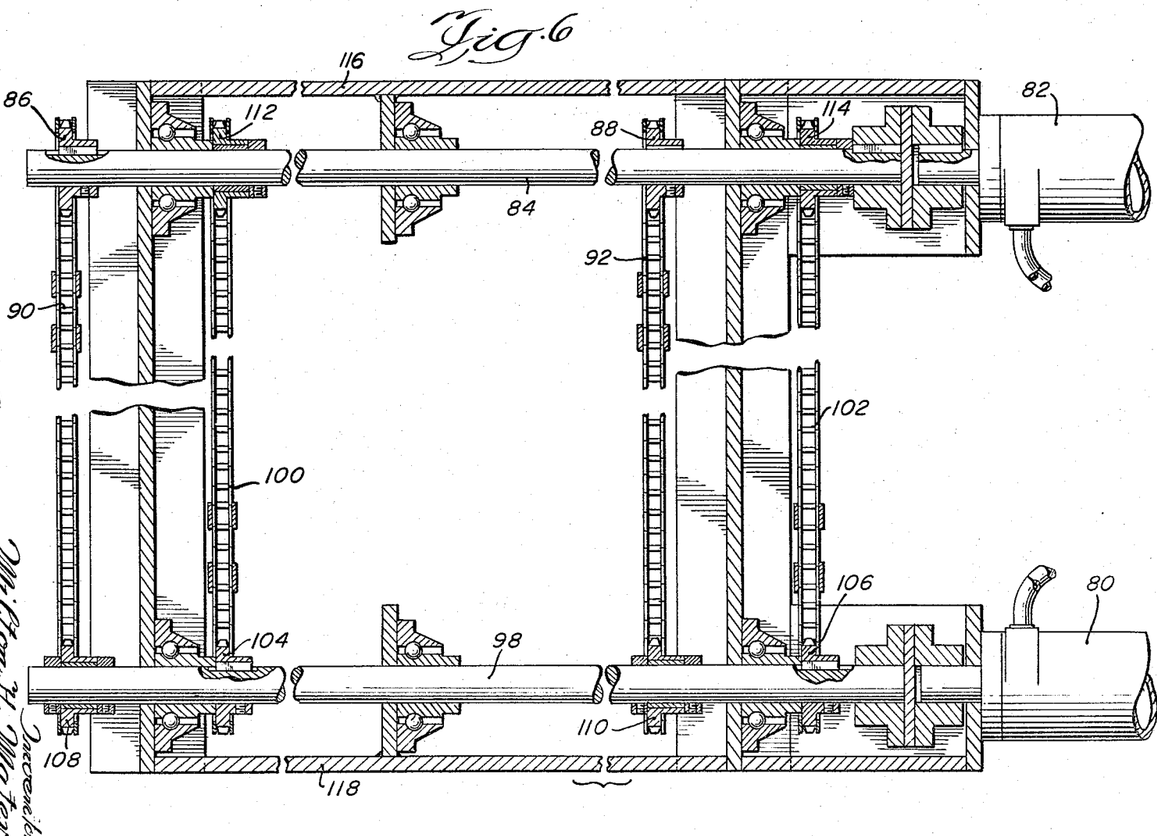
FIGURE 6 is a sectional view taken along the line 6—6 of FIGURE 5.
Figure 7:
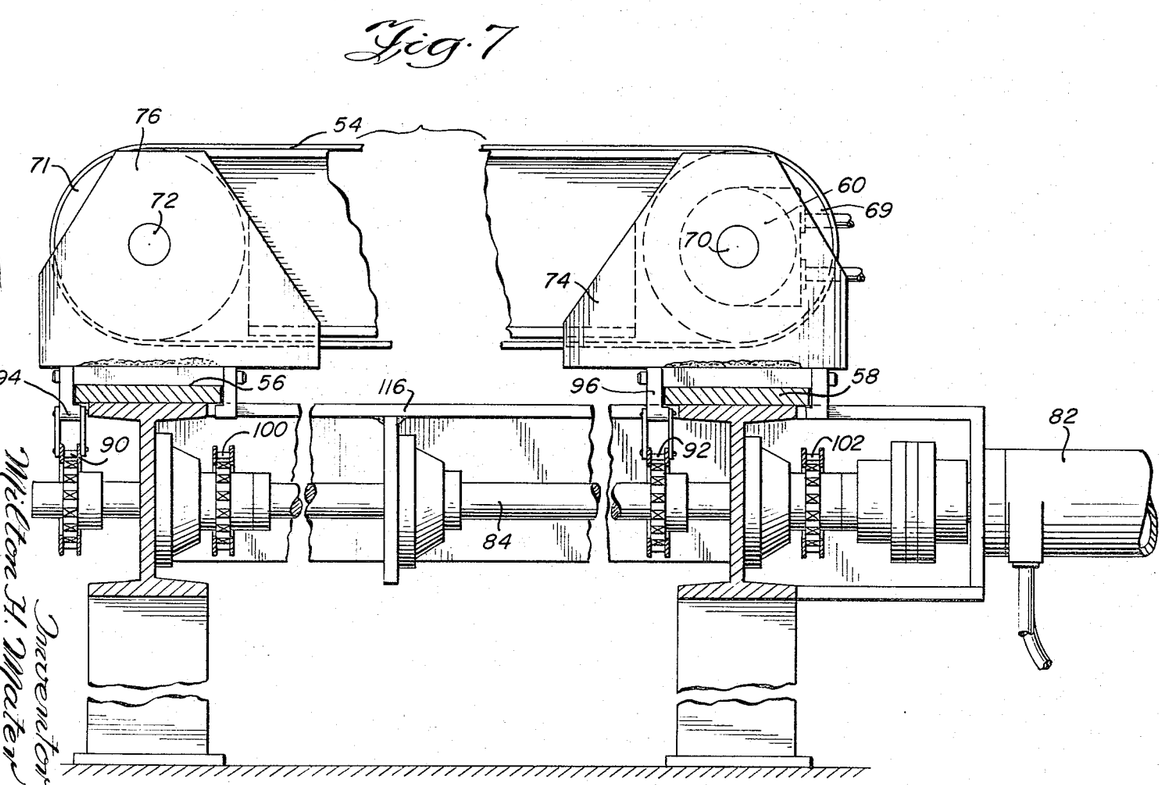
FIGURE 7 is a sectional elevation of a portion of an outfeed conveyor, taken along the line 7—7 of FIGURE 4.

As shown in FIGURE 1, the illustrative embodiment of the invention includes an infeed table 20, an edger assembly 22 and an outfeed table 24. The infeed table 20 is positioned to receive slabs of lumber which require cutting, the slabs being placed upon infeed rollers 26. The edger assembly 22 includes edging saws 28, 29 and 30 which are splined to an arbor 32, to permit lateral movement along the arbor. The arbor is driven by a suitable motor 34.

Saw guides 36, 37 and 38 are provided to laterally shift saws 28, 29 and 30 respectively. The saw guides are moved by means of guide control arms 40, 41 and 42 which are pivotally connected to control arm brackets 46. The brackets 46 are connected to a crossbeam 44.

Shadow line guides 48 are utilized to cast a shadow line upon the surface of the lumber slab, to mark the path which will be cut by the edger saws. The shadow line guides may be of the type disclosed in the United States patent to Horstkotte, No. 2,510,471, and include shadow lines 50 located below light sources 51, which are connected to rods 49. The shadow lines 50 are also connected to rods 49 which are journaled within end members 51. A pulley system 52, which will be described subsequently in more detail, is connected to the rods 49 and to the edger saws, to cause rotation of the rods and hence pivotal movement of the shadow lines 50, in response to lateral movement of the saws.

The outfeed table 24 includes a pair of endless outfeed belts 54 and 55 which are moved in the direction of outfeed to convey the good cut board for further processing, and are also moved laterally along tracks 56 and 58 in response to lateral movement of the edger saws. The outfeed belts are automatically positioned intermediate the planes of the saws, and each has a width that is smaller than the distance between two of the saws so that after the lumber is trimmed, only the cut board will be conveyed by one of the outfeed belts and the wane edges will fall due to lack of support.

A hydraulic system is utilized to drive the outfeed belts in both the outfeed direction and laterally along the tracks 56 and 58. As shown most clearly in FIGURES 4–7, hydraulic motors 60 and 62 are connected to drive outfeed belts 54 and 55 respectively, and for simplicity are connected in series (see FIG. 12) to drive both belts simultaneously. The hydraulic motors are suitably supplied with fluid under pressure by means of an oil reservoir 64, motor 66 and a pump 68 driven by the motor 66.

Each outfeed belt is mounted on pulleys 69 and 71 which are positioned between end plates 74 and 76 respectively by means of driven shaft 70 and idler shaft 72. The end plates are connected to chains located below the tracks 56 and 58, which chains are driven by hydraulic motors 80 and 82. As shown most clearly in FIGURES 6 and 7, the outfeed belt 54 is laterally moved in response to the driving of shaft 84 by hydraulic motor 82. Sprockets 86 and 88 are keyed to shaft 84 and are positioned to engage and drive chains 90 and 92 which are connected to the end plates 76 and 74 respectively by connecting linkages 94 and 96. In a similar manner, outfeed belt 55 is laterally driven in response to rotation of shaft 98 by hydraulic motor 80. The outfeed belt 55 is connected to chains 100 and 102 which are driven by means of sprockets 104 and 106 respectively, which are keyed to the shaft 98. While sprockets 86 and 88 are keyed to shaft 84, sprockets 112 and 114 are free to rotate thereon. Similarly, while sprockets 104 and 106 are keyed to shaft 98, sprockets 108 and 110 idle thereon. Hence, each chain is connected at one end to a driven sprocket and at the other end to an idler sprocket. The shafts and their respective sprockets are located within end members 116 and 118.

A control system is provided for automatically laterally shifting the outfeed belts in response to the lateral shift of the edger saw. In the illustrative embodiment pulley and cable system is utilized to control the actuation of the belt-shifting motors 80 and 82. The cables are directly connected to the shadow line guides, which guides are responsive to the lateral movement of the edger saws. The cables are also connected to the outfeed belts.

Movement of the edger saws is transmitted via the cables to a control mechanism 124, to actuate the motors which move the outfeed belts. The control mechanism includes switches which are actuated by the pulleys, which in turn are responsive to movement of the edger saws and the belts. Movement of the belts is transmitted back to the control mechanism to deactuate the motors when the belts are in the desired position intermediate the blades of the saw.

Figure 8:
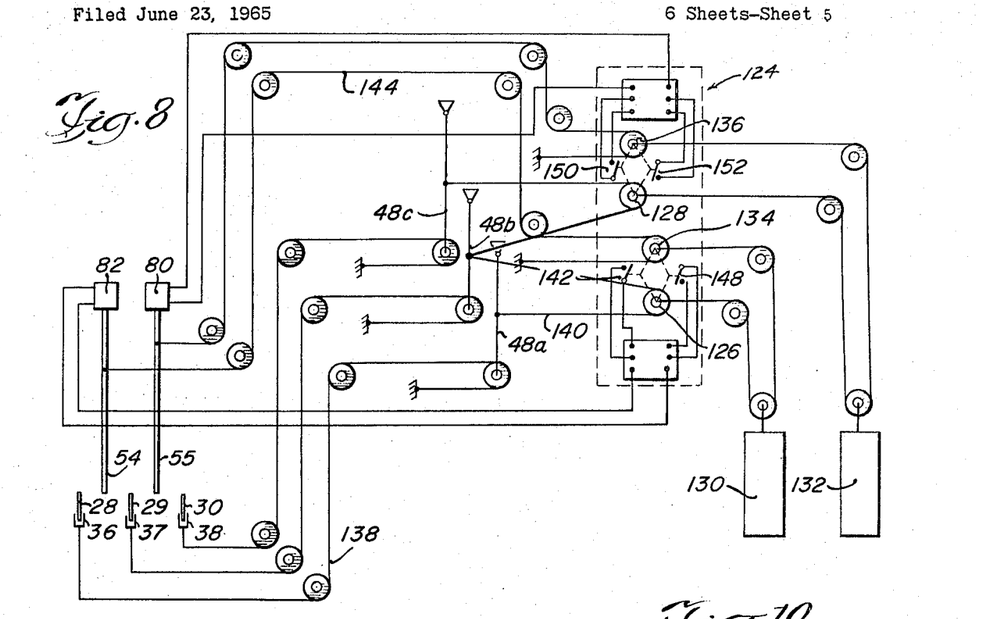
FIGURE 8 is a schematic diagram of a positioning control system in accordance with the present invention.

The pulley and cable control system is shown schematically in FIGURE 8 where it can be seen that lateral movement of an edger saw is transmitted to pivot the shadow line guides which results in sliding movement of either pulley 126 or pulley 128 or both, depending upon which saw is laterally moved. The pulley system is kept taut and pulleys 126 and 128 are biased to the right (with respect to FIGURE 8) by weights 130 and 132 respectively. Lateral movement of one of the outfeed belts causes sliding movement of either pulley 134 or 136, or both, depending upon which outfeed belt is laterally shifted. Weights 130 and 132 additionally bias pulleys 134 and 136, respectively, to the right (with respect to FIGURE 8). The movement of pulleys 126, 128, 134 and 136 controls the actuation of hydraulic motors 80 and 82 which control the lateral shift of the outfeed belts 55 and 54 respectively.

The operation of the control system can be most easily understood by describing a typical operation. The directions that are hereinafter stated are with respect to the diagram of FIGURE 8.

If, for example, edger saw 28 is moved to the left, a force upon shadow line guide 48a will be transmitted via cable 138 to pivot guide 48a in a clockwise direction. The cable 140, which is connected to the shadow line guide 48a, will shift pulley 126 to the left, causing actuation of switch 142 to thereby actuate the hydraulic motor 82. The hydraulic motor 82 will shift outfeed belt 54 to the left, and this shift will be transmitted via cable 144 to shift pulley 134 to the left. When pulley 134 becomes aligned with pulley 126, the switch 142 will be deactuated to thereby deactuate the hydraulic motor and stop further lateral shift of the outfeed belt 54.

As can be readily seen from the schematic diagram of FIGURE 8, the outfeed belt 54 will only travel a portion of the distance traveled by edger saw 28, due to the mechanical advantage resulting from the cable connections to shadow line guide 48a. For example, if cable 140 is connected between the connection of cable 138 to shadow line guide 48a and its pivot point at the exact midpoint, pulley 126 will only move one-half the distance of edger saw 28, due to the two-to-one relationship. In a preferred embodiment, the two-to-one relationship (shown in FIGURE 8 with shadow line guide 48a) is utilized. To achieve the above described mechanical advantage, the cables are connected to vertical levers extending from the shadow line guides, such as the vertical rods connecting shadow lines 50 to rods 49.

If saw 28 was laterally shifted to the right, switch 148 would be actuated by pulley 126 to rotate the hydraulic motor 82 in the opposite direction and thereby shift the outfeed belt 54 to the right. Again, when pulley 134 would align with pulley 126, the switch 148 would be deactuated and lateral shifting of the outfeed belt 54 would cease.

As can be readily observed from FIGURE 8, lateral shift of saw 29 will result in shifting movement of both pulley 126 and pulley 128 to thereby cause both hydraulic motors 80 and 82 to be actuated. The operation of pulleys 128 and 136 is similar to the operation described in conjunction with pulleys 126 and 134. Pulley 128 actuates switches 150 and 152, the particular switch depending upon the direction of movement of the pulley, and pulley 136 deactuates these switches.

Figures 9, 10:
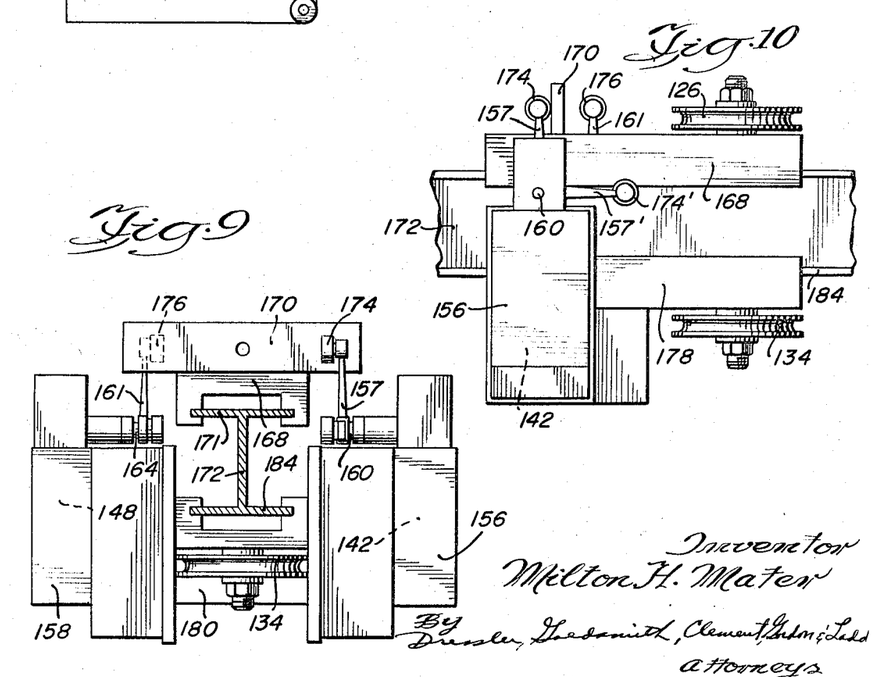
FIGURE 9 is a front elevation of a positioning control mechanism.
FIGURE 10 is a side elevation thereof.

A switching control mechanism in accordance with the principles of the invention is shown in FIGURES 9 and 10, and includes a switch body 156 having an actuating arm 157 extending therefrom and connected to a rotatable shaft 160. A second switch body 158 having extending actuator arm 161 rotatably connected thereto on shaft 164, is also provided. Included within the switch bodies 156 and 158 are microswitches 142 and 148 respectively which are actuated when arms 157 and 161 are in other than a vertical position, and are deactuated when the arms are in a vertical position.

The pulley 126 is affixed to an upper slider 168 having a flange 170 connected thereto. Movement of the pulley 126 will cause movement of the slider 168 along hte track 171 of beam 172. The flange 170 will contact either roller 174 of arm 157 or roller 176 of arm 161, depending upon the direction of movement of the pulley 126.

Pulley 134, which is responsive to the movement of the outfeed belt 54, is affixed to a lower slider 180 which itself is affixed to switch bodies 156 and 158. The lower slider 180 is positioned to slide along track 184 of beam 172.

The actuating arm 157 is spring biased in the clockwise direction (with respect to FIGURE 10) so that it will tend to return to its vertical, deactuating position. Hence, movement of pulley 134 will cause relative pivotal movement between the actuating arm and the respective switch body, as a result of the spring action which tends to urge the arm toward its vertical position. However, there is no spring action urging arm 142 toward its vertical position once the arm 142 has been pivoted in the counterclockwise direction more than 45° by flange 170 and the flange 170 is able to pass over the roller 174. If there were a spring action, as soon as flange 170 would pass over the roller 174, the arm 142 would swing back to its vertical position and deactuate the switch.

An auxiliary actuating arm 157' is connected to shaft 160 and is disposed perpendicular to arm 157. The function of the auxiliary arm is to make certain that an actuating arm is always present for contact by flange 170. An auxiliary arm (not shown) is also connected to shaft 164 and is disposed perpendicular to the actuating arm 161.

Figure 11:
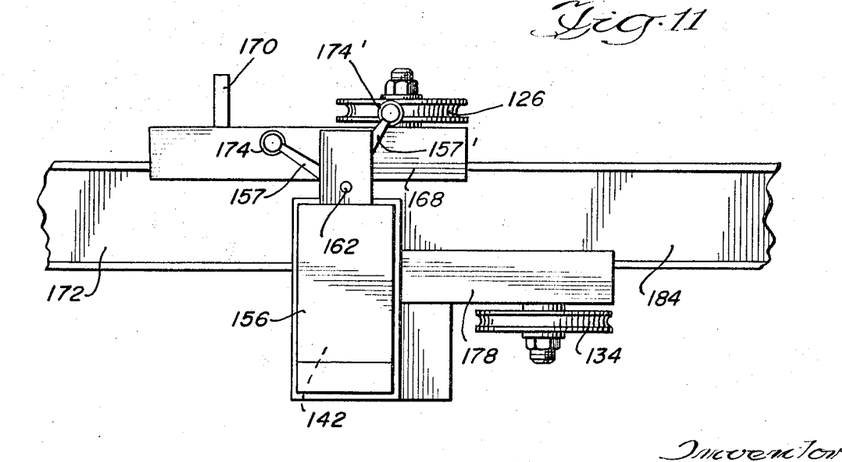
FIGURE 11 is a side elevation, similar to FIGURE 10, of the positioning control mechanism in an actuated condition.

In the operation of the control mechanism, as pulley 126 is moved to the left (with respect to FIGURE 10), flange 170 contacts roller 174 and pivots arm 157 with respect to the switch body 156. This causes actuation of the switch 142 which, as can be seen from FIGURE 8, causes hydraulic motor 82 to move outfeed belt 54. If, for example, saw 28 is laterally shifted a relatively large distance, flange 170 may pivot arm 157 to greater than a 45° angle with respect to its vertical position. As illustrated in FIGURE 11, the flange 170 will then continue over the roller 174 and no longer be in contact with it. Under such circumstances, the switch will remain actuated until the arm 157 is back in its vertical position.

The arm 157 will be moved back to its vertical position in the following manner. As the appropriate outfeed belt begins to move, pulley 134 and connected switch body 156 slide along the lower rail 184 of beam 172. If flange 170 had previously moved past the roller 174 (as shown in FIGURE 11) there will be no spring action urging arm 157 to its vertical position, and switch body 156 and arm 157 will move together in the same relative position until the flange 170 contacts the roller 174' of auxiliary arm 157'. When this occurs, arm 157 will commence to pivot toward its vertical position and will so move until it has finally reached the vertical position, and at that time, the switch 142 will be deactuated. If flange 170 had not originally moved over roller 174, and arm 157 was disposed at less than a 45° angle with respect to its vertical position, movement of pulley 134 would immediately cause the arm 157 to be pivoted toward its vertical position.

When pulleys 126 and 134 move to the right (with respect to FIGURE 10), a similar operation will occur but instead of contacting roller 174 of arm 157, flange 170 will contact roller 176 of arm 161. In the illustrative embodiment, two of the control mechanisms shown in FIGURES 9–11 are utilized whereby each control mechanism controls the actuation of one of the hydraulic motors for shifting an outfeed belt. Actuation of the microswitches contained within the switch bodies causes actuation of solenoids to operate the hydraulic valves which control the hydraulic motors.

Figure 12:
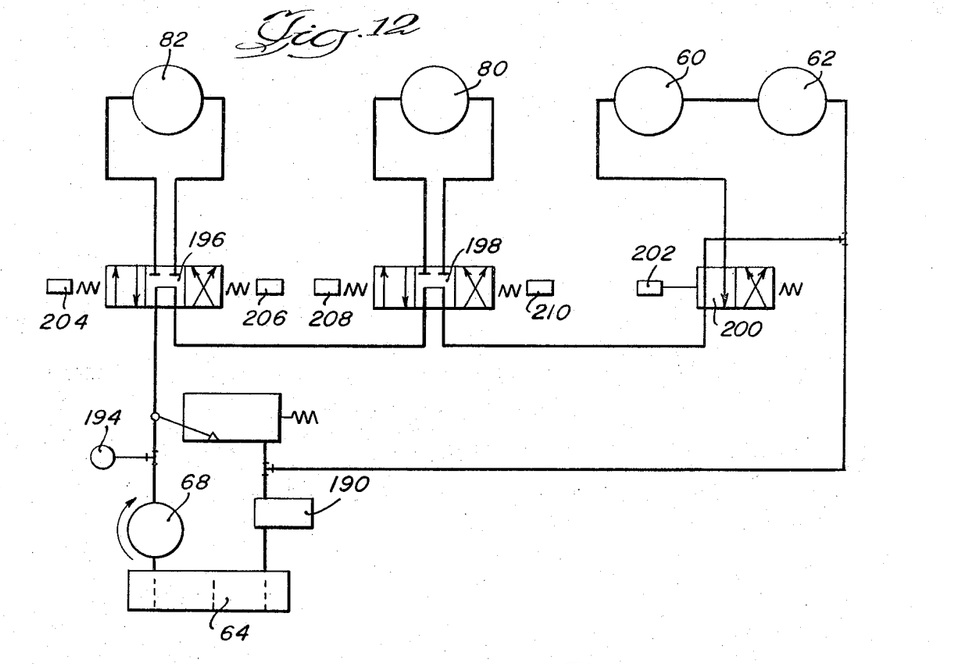
FIGURE 12 is a circuit diagram of a hydraulic control system in accordance with the teachings of the present invention.

A schematic diagram of the hydraulic system utilized in the operation of the illustrative embodiment of the present invention is shown in FIGURE 12. This system includes a conventional reservoir 64, pump 68, filter 190, relief valve 192 and pressure guage 194. Hydraulic motors 82 and 80 are connected in the circuit through solenoid operated hydraulic control spool valves 196 and 198, respectively, which valves are of the three-position, four-way type. Solenoids 204 and 206 are actuated by switches 142 and 148 and solenoids 208 and 210 are actuated by switches 150 and 152. Another four-way spool valve 200, adapted to be actuated by solenoid 202 controlled by the operator, is positioned in the line for rotating the outfeed belt hydraulic motors 60 and 62.

Briefly, the operation of the lumber processing system forming an illustrative embodiment of the present invention is as follows: The slabs of lumber to be trimmed are placed upon infeed rollers 26 and the saw guide arms are manually moved by the operator to laterally shift the edger saws to a desired position. Lateral shifting of the edger saws causes pivotal movement of the shadow lines and hence shadows are cast upon the lumber to mark the path of the saws.

The lateral shifting of saw 28, for example, causes movement of pulley 126 to cause pivotal movement of actuating arm 157 of the control switch 142. The control switch 142 actuates solenoid 204 to cause operation of the hydraulic motor 82, resulting in lateral shifting of the outfeed belt 54. As the outfeed belt is laterally shifted, the body 156 of the control switch moves to allow the actuating arm 157 to pivot back to its vertical position and thereby deactuate the hydraulic motor.

The motor 34 is actuated by the operator to rotate the saw arbor 32, and solenoid 202 is actuated so that the outfeed belts 54 and 55 move in the outfeed direction by means of hydraulic motors 60 and 62.

The lumber slab is fed to the edger saws 28 and 29, for example, and the cut board is conveyed via outfeed belt 54 which is positioned intermediate the planes of the two saws. Since belt 54 has a width that is smaller than the distance between the two saws, only the good cut board will be supported by the belt and the wane edges will fall below, either to the floor or to a separate conveyor.

The outfeed belt table 24 and its control system can be connected to existing edger assemblies, to afford a relatively inexpensive changeover to the system of the present invention. It can be utilized with any type of saw shifting mechanism, including shifters which operate manually, electrically, hydraulically, pneumatically, or otherwise. The novel system can of course operate on edger assemblies which do not have shadow line guide systems, and when utilized with edger assemblies which do have shadow lines it can be connected directly to either the shifting mechanism or to the shadow line guide system. The outfeed belts are automatically laterally shifted and positioned intermediate the planes of the edger saws in response to lateral shift of the saws, and there is no need for a vertical separating member to separate the wane edges from the cut board.

Although the illustrative embodiment utilizes three edger saws and two outfeed belts, it is to be understood that more or less saws and outfeed belts can be effectively utilized without departing from the scope of the invention. Further, other control systems than pulley and cable systems can be utilized as well as electrical motor drives instead of hydraulic motor drives. Instead of the control cables being connected to the shadow line guides they could be connected directly to other members which are responsive to lateral shifting of the saws, such as the saw guide control arms or the saw guides themselves. The apparatus shown in the accompanying drawings is for illustrative purposes only, and many other modifications and substitutions may be made without departing from the spirit and novel scope of the present invention.

What is claimed is:

1. A system for automatically controlling the lateral shift of an outfeed belt in response to the movement of an edger saw which comprises: means for automatically laterally shifting said outfeed belt; a control switch comprising a switch body with an actuating member extending therefrom, said member being adapted to actuate said lateral shifting means when in a first position and to deactuate said lateral shifting means when in a second position, first means for transmitting movement to said member to position the same in said first position, said first transmission means being operable in response to lateral shift of said edger saw; second means for transmitting movement to said member to position the same in said second position, said second transmission means being operable in response to lateral shift of said outfeed belt.

2. A system for automatically controlling the lateral shift of an outfeed belt in response to the movement of an edger saw which comprises: means for automatically laterally shifting said outfeed belt; a control switch comprising a switch body with a pivotable member extending therefrom, said member being adapted to actuate said lateral shifting means when in a first position and to deactuate said lateral shifting means when in a second position, first means for transmitting pivotal movement to said member to position the same in its first position, said first transmission means being operable in response to lateral shift of said edger saw; second means for transmitting pivotal movement to said member in a direction opposite the abovementioned pivotal movement to position the same in its second position, said second transmission means being operable in response to lateral shift of said outfeed belt.

3. A system for automatically controlling the lateral shift of an outfeed belt in response to the movement of an edger saw which comprises: hydraulic motor driven means for automatically laterally shifting said outfeed belt; a control switch comprising a switch body with an actuating member extending therefrom, said member being adapted to actuate said hydraulic motor when in a first position and to deactuate said hydraulic motor when in a second position, first means, including pulley means, for transmitting movement to said member to position the same in its first position, said first transmission means being operable in response to lateral shift of said edger saw; second means, including pulley means, for transmitting movement to said member to position the same in its second position, said second transmission means being operable in response to lateral shift of said outfeed belt.

4. A system for automatically controlling the lateral shift of an outfeed belt in response to the movement of an edger saw which comprises: means for automatically laterally shifting said outfeed belt in two directions; a first control switch comprising a switch body with an actuating member extending therefrom, said member being adapted to actuate said lateral shifting means for first directional movement of said outfeed belt when in a first position and to deactuate said lateral shifting means when in a second position, a second control switch comprising a switch body with an actuating member extending therefrom, said member being adapted to actuate said lateral shifting means for second directional movement of said outfeed belt when in a first position and to deactuate said lateral shifting means when in a second position; first means for transmitting movement to said members to position the same in their first positions, said first transmission means being operable in response to lateral shift of said edger saw; second means for transmitting movement to said members to position the same in their second positions, said second transmission means being operable in response to lateral shift of said outfeed belt.

5. In a lumber processing system including a plurality of relatively laterally shiftable saws: an outfeed conveying apparatus adapted to be positioned adjacent said saws in board-receiving relationship therewith, said apparatus comprising at least one outfeed belt having a width that is smaller than the distance between the saws whereby only the cut board will be conveyed by said belt and the wane edges will fall; means for supporting said belt, said supporting means including a track upon which said belt can slide laterally; means for driving said belt; means for automatically laterally shifting said belt to position the same intermediate the cutting planes of two of said saws; a control switch comprising a switch body with an actuating member extending therefrom, said member being adapted to actuate said lateral shifting means when in a first position and to deactuate said lateral shifting means when in a second position, first means for transmitting movement to said member to position the same in its first position, said first transmission means being operable in response to lateral shift of one of said saws; second means for transmitting movement to said member to position the same in its second position, said second transmission means being operable in response to lateral shift of said outfeed belt.

6. An outfeed conveying apparatus for cut boards which comprises: an endless belt adapted for positioning adjacent to a pair of relatively laterally shiftable edger saws in board-receiving relationship therewith, said belt having a width that is smaller than the distance between the saws whereby only the cut board will be conveyed by said belt and the wane edges will fall; means for driving said belt; means for supporting said belt, said supporting means including means for guiding said belt during lateral shifting thereof; means for automatically laterally shifting said belt in two directions in response to relative lateral shift of said saws; and means for controlling said laterally shifting means to position said belt intermediate the cutting planes of said saws, said controlling means including a first control switch comprising a switch body with an actuating member extending therefrom, said member being adapted to actuate said lateral shifting means for first directional movement of said belt when in a first position and to deactuate said lateral shifting means when in a second position, a second control switch comprising a switch body with an actuating member extending therefrom, said member being adapted to actuate said lateral shifting means for second directional movement of said belt when in a first position and to deactuate said lateral shifting means when in a second position; first means for transmitting movement to said members to position the same in said first positions, said first transmission means being operable in response to lateral shift of said edger saw; second means for transmitting movement to said members to position the same in said second positions, said second transmission means being operable in response to lateral shift of said belt.

7. A lumber processing system which comprises: a plurality of relatively laterally shiftable saws; an outfeed conveying apparatus positioned adjacent said saws in board-receiving relationship therewith, said apparatus comprising at least one outfeed belt; means for supporting said belt; said supporting means including a track upon which said belt can slide laterally; means for driving said belt; means for automatically laterally shifting said belt to position the same intermediate the cutting planes of two of said saws, said laterally shifting means being responsive to relative lateral shifting of said two saws; a control switch comprising a switch body with a pivotable member extending therefrom, said member being adapted to actuate said lateral shifting means when in a first position and to deactuate said lateral shifting means when in a second position, first means for transmitting pivotal movement to said member to position the same in its first position, said first transmission means being operable in response to lateral shift of said edger saw; second means for transmitting pivotal movement to said member in a direction opposite the abovementioned pivotal movement to position the same in its second position, said second transmission means being operable in response to lateral shift of said outfeed belt.

References Cited by the Examiner

UNITED STATES PATENTS 2,672,896   3/1954   Shurtliff ____________ 143—38
3,225,800   12/1965   Pease _______________ 143—37

FOREIGN PATENTS 670,907   9/1963   Canada.

WILLIAM W. DYER, JR., *Primary Examiner.*

R. J. ZLOTNIK, *Assistant Examiner.*